US009451174B2

(12) United States Patent
Hataguchi et al.

(10) Patent No.: US 9,451,174 B2
(45) Date of Patent: *Sep. 20, 2016

(54) IMAGE PICKUP APPARATUS

(71) Applicant: Renesas Electronics Corporation, Kawasaki-shi, Kanagawa (JP)

(72) Inventors: Takeshi Hataguchi, Kanagawa (JP); Kazuhiko Takami, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,579

(22) Filed: Jun. 12, 2015

(65) Prior Publication Data
US 2015/0281541 A1 Oct. 1, 2015

Related U.S. Application Data

(63) Continuation of application No. 14/001,540, filed as application No. PCT/JP2012/001280 on Feb. 24, 2012, now Pat. No. 9,088,725.

(30) Foreign Application Priority Data

Mar. 8, 2011 (JP) .................................. 2011-050114

(51) Int. Cl.
*H04N 5/235* (2006.01)
*H04N 13/02* (2006.01)
*G03B 7/093* (2006.01)

(52) U.S. Cl.
CPC ............ *H04N 5/2353* (2013.01); *G03B 7/093* (2013.01); *H04N 5/2351* (2013.01); *H04N 13/0239* (2013.01); *H04N 13/0296* (2013.01)

(58) Field of Classification Search
CPC ... H04N 5/2353; H04N 5/2351; G03B 7/093
See application file for complete search history.

(56) References Cited

U.S. PATENT DOCUMENTS 8,823,789 B2    9/2014  Ono
2002/0057338 A1 5/2002  Fujiwara et al.
(Continued)

FOREIGN PATENT DOCUMENTS

CN    1710935 A      12/2005
JP    09-102967 A    4/1997
(Continued)

OTHER PUBLICATIONS

Communication dated Dec. 31, 2014 from The State Intellectual Property Office of the People's Republic of China in counterpart application No. 201280012460.5.

*Primary Examiner* — Twyler Haskins
*Assistant Examiner* — Fayez Bhuiyan
(74) *Attorney, Agent, or Firm* — Sughrue Mion, PLLC

(57) ABSTRACT

A first control unit (172), which controls the timing at which a first image pickup unit (110) starts exposure, obtains a second difference (Δt2) by subtracting a first difference (Δt1) from an exposure-output time (AA) of the first image pickup unit (110), and outputs a first control signal (CTR1) for delaying the timing at which the first image pickup unit (110) starts an exposure, by the second difference (Δt2). The exposure-output time is a time lag between when the image pickup unit starts an exposure and when output of an image signal obtained by the exposure is started. The first difference (Δt1) is a difference between a timing at which the first image pickup unit (110) started outputting a predetermined image signal and a timing at which a second image pickup unit (150) started an exposure for obtaining an image signal that the second image pickup unit (150) outputted immediately after the first image pickup unit (110) started outputting the predetermined image signal. In such a way, the timings at which a plurality of image pickup units provided in an image pickup apparatus start exposure are synchronized.

8 Claims, 10 Drawing Sheets

(56) References Cited

U.S. PATENT DOCUMENTS

| | | |
|---|---|---|
| 2005/0280702 A1 | 12/2005 | Nakano et al. |
| 2006/0204038 A1 | 9/2006 | Yokota et al. |
| 2010/0060735 A1 | 3/2010 | Sato |
| 2013/0235163 A1* | 9/2013 | Joo .................. H04N 13/007 348/47 |

FOREIGN PATENT DOCUMENTS

| | | |
|---|---|---|
| JP | 2000-341719 A | 12/2000 |
| JP | 2002-095015 A | 3/2002 |
| JP | 2002-145072 A | 5/2002 |
| JP | 2006-005608 A | 1/2006 |
| JP | 2006-203448 A | 8/2006 |
| JP | 2006-345246 A | 12/2006 |
| JP | 2007-028236 A | 2/2007 |
| JP | 2007-060129 A | 3/2007 |
| JP | 2008-211373 A | 9/2008 |
| JP | 2010-161739 A | 7/2010 |

* cited by examiner

IMAGE PICKUP APPARATUS

CROSS-REFERENCE TO RELATED APPLICATION

This application is a Continuation of U.S. application Ser. No. 14/001,540, filed Aug. 26, 2013, which is a national stage entry of PCT/JP2012/001280, filed Feb. 24, 2012, claiming priority based on Japanese Patent Application No. 2011-050114, filed Mar. 8, 2011, the disclosures of which are incorporated herein by reference in their entirety.

TECHNICAL FIELD

The present invention relates to an image pickup apparatus and more specifically to an image pickup apparatus including a plurality of image pickup units.

BACKGROUND ART

Imaging of a subject from a plurality of different viewpoints is being performed in various technological fields. Examples include stereo cameras, which images a subject from left-eye and right-eye viewpoints and generate a three-dimensional picture from the left-eye-viewpoint and right-eye-viewpoint images, and twin-lens stereoscopic, electronic, three-dimensional image pickup apparatuses. The "twin-lens stereoscopic" refers to a technology for measuring the position or the like of a mobile object, such as a vehicle, robot, or animal, and is a technique by which such as the distance from the image pickup apparatus to the mobile object is obtained from a picture obtained by imaging the mobile object from different angles using a plurality of image pickup units included in the image pickup apparatus and from a parameter, such as the focal length of the lens of each image pickup unit or the distance between the image pickup units, according to the principle of triangulation.

Image pickup apparatuses as described above are required to synchronize the timings at which the image pickup units start exposures. For example, in an image pickup apparatus disclosed in Patent Literature 1, as shown in FIG. 10, a sensor drive signal generation unit 34 generates a sensor drive signal and outputs it to a first CCD image pickup unit 12 and a second CCD image pickup unit 22 to cause the two image pickup units to perform exposures simultaneously. Note that FIG. 10 is generated by changing the reference signs of FIG. 1 of Patent Literature 1.

An image pickup apparatus disclosed in Patent Literature 2 also synchronizes the timings at which two image pickup units start exposures, by providing an exposure start timing signal provided to one image pickup unit, as well as to the other image pickup unit.

In the following description, a control signal for causing an image pickup unit to start an exposure, such as the sensor drive signal or exposure start timing signal, will be referred to as an exposure start signal.

CITATION LIST

Patent Literature

[Patent Literature 1] Japanese Unexamined Patent Application Publication No. 2007-28236
[Patent Literature 2] Japanese Unexamined Patent Application Publication No. 2000-341719

SUMMARY OF INVENTION

Technical Problem

If a plurality of image pickup units included in an image pickup apparatus receive the same exposure start signal, the image pickup units may be able to start exposures simultaneously after the same length of time.

However, the plurality of image pickup units included in the single image pickup apparatus are not necessarily the same image pickup units. For example, to reduce cost, high-functionality and low-functionality image pickup units may be used as one and the other image pickup units. Further, chips manufactured by different manufacturers may be used as chips corresponding to the plurality of image pickup units used in the single image pickup apparatus.

In these cases, the time taken from the reception of an exposure start signal to the start of an exposure most likely varies between the image pickup units. For this reason, even if the plurality of image pickup units receive the same exposure start signal, they may start exposures at different timings.

Solution to Problem

A first exemplary aspect of the present invention is a image pickup apparatus. The image pickup apparatus includes a first image pickup unit, a second image pickup unit, and a first control unit.

The first image pickup unit repeats an exposure and output of an image signal obtained through the exposure to obtain a first picture signal and outputs the first picture signal.

The second image pickup unit repeats an exposure and output of an image signal obtained through the exposure to obtain a second picture signal and outputs the second picture signal.

The first control unit controls the timing at which the first image pickup unit or the second image pickup unit starts an exposure. In particular, in the case of controlling the timing at which the second image pickup unit starts an exposure, the first control unit subtracts a first difference from exposure-output time of the first image pickup unit to obtain a second difference, and outputs a first control signal for delaying the timing at which the second image pickup unit starts an exposure, by a value obtained by subtracting the second difference from an exposure interval. In the case of controlling the timing at which the first image pickup unit starts an exposure, the first control unit outputs a first control signal for delaying the timing at which the first image pickup unit starts an exposure, by the second difference.

The exposure-output time is a time lag between when each of the first and second image pickup units starts an exposure and when the image pickup unit starts outputting an image signal obtained through the exposure.

The first difference is a difference between the timing at which the first image pickup unit started outputting a predetermined image signal and the timing at which the second image pickup unit started an exposure for obtaining an image signal that the second image pickup unit outputted immediately after the first image pickup unit started outputting the predetermined image signal.

The implementation of the image pickup apparatus according to the above exemplary aspect as any of a method and a system are also effective as other aspects of the present invention.

Advantageous Effects of Invention

According to the technology of the present invention, even if a plurality of image pickup units included in an image pickup apparatus have different functionalities, it is possible to synchronize the timings at which they start exposures.

DESCRIPTION OF EMBODIMENTS

Figure 1:
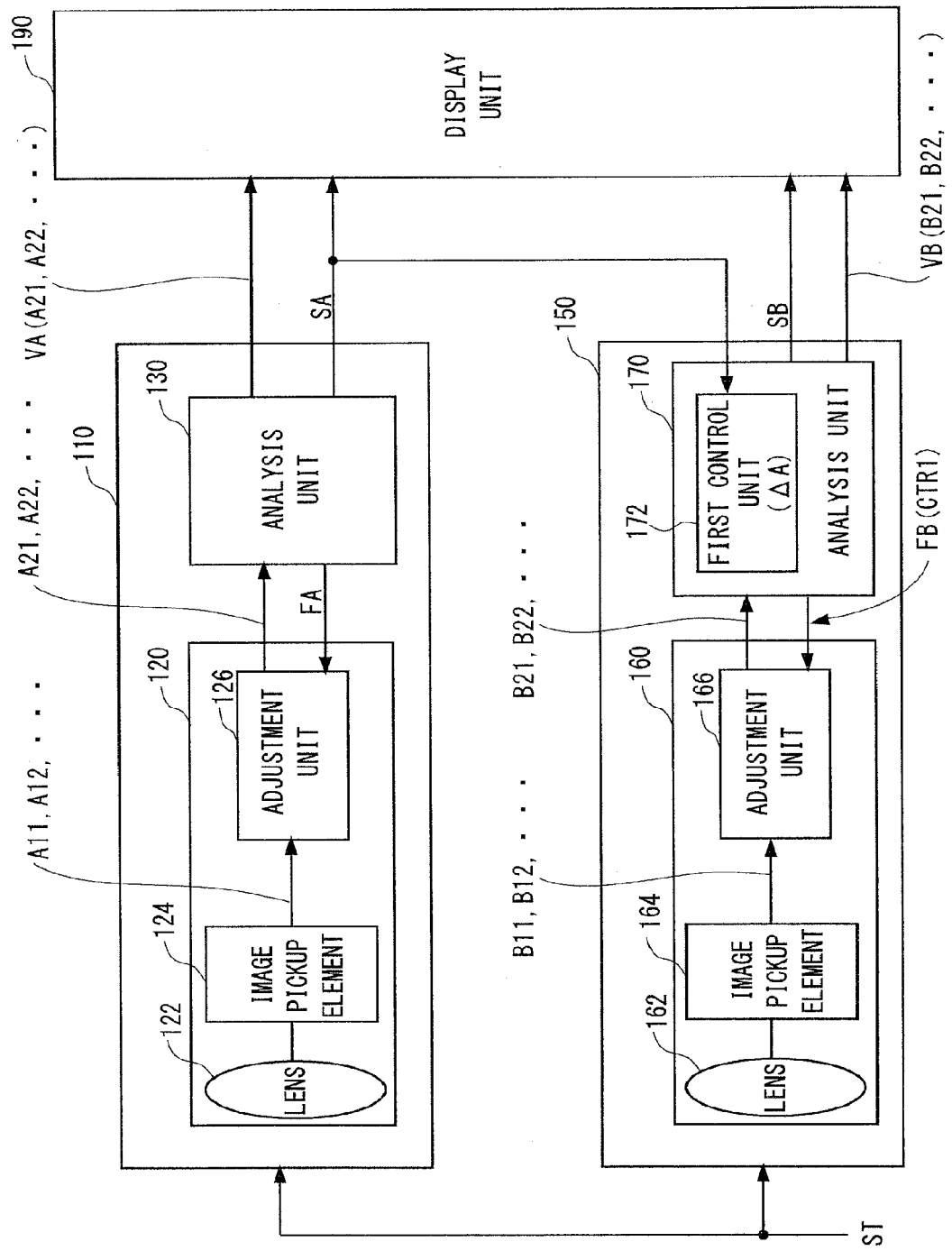
FIG. 1 is a diagram showing an image pickup apparatus according to a first embodiment of the present invention.

Now, embodiments of the present invention will be described with reference to the drawings. For the sake of clarity, the description below and the drawings are subjected to omissions and simplification as appropriate. In the drawings, the same components are given the same reference signs and therefore repeated description thereof will be omitted as appropriate.

First Embodiment

FIG. 1 shows an image pickup apparatus 100 according to a first embodiment of the present invention. The image pickup apparatus 100 includes a first image pickup unit 110, a second image pickup unit 150, and a display unit 190. The first image pickup unit 110 and the second image pickup unit 150 receive the same exposure start signal ST. The exposure start signal ST is outputted, for example, by depressing an imaging start button (not shown) provided on the image pickup apparatus 100.

Upon receipt of the exposure start signal ST, the first image pickup unit 110 starts imaging and thus obtains a first picture signal VA, and outputs it to the display unit 190.

Upon receipt of the exposure start signal ST, the second image pickup unit 150 starts imaging and obtains a second picture signal VB through the imaging, and outputs the second image signal VB to the display unit 190.

Using the first picture signal VA outputted from the first image pickup unit 110 and the second picture signal VB outputted from the second image pickup unit 150, the display unit 190 generates and displays a three-dimensional picture.

The first image pickup unit 110 and the second image pickup unit 150 will be described in detail.

The first image pickup unit 110 includes an image sensor module 120 and an analysis unit 130. In response to the exposure start signal ST, the first image pickup unit 110 starts the first exposure and obtains an image signal A21 through the first exposure, and outputs it. Subsequently, the first image pickup unit 110 repeats an exposure and output of an image signal obtained through the exposure. In this way, the first image pickup unit 110 outputs sequentially image signals (A21, A22, etc.) forming the first picture signal VA to the display unit 190.

The time between when the first image pickup unit 110 starts an exposure and when it outputs an image signal obtained through the exposure (A21, A22, etc.) is referred to as "exposure-output time." The "exposure-output time" varies according to a specification, such as a process performed in the image pickup unit, and therefore may vary between the image pickup units. Hereafter, the exposure-output time of the first image pickup unit 110 will be represented by "AA."

The image sensor module 120 is similar to a typical type of image sensor module and includes a lens 122, an imaging element 124, and an adjustment unit 126. After the exposure starts, the imaging element 124 sequentially photoelectrically converts optical signals from the lens 122 into a plurality of image signals A11, A12, etc. at a predetermined sampling rate (exposure rate) and outputs the image signals to the adjustment unit 126.

The adjustment unit 126 adjusts the gain of the image signals A11, A12, etc. from the imaging element 124 and outputs resulting image signals A21, A22, etc. to the analysis unit 130.

The analysis unit 130 performs analysis by performing image processing on the image signals A21, A22, etc. from the image sensor module 120 and feeds back exposure information FA corresponding to an analysis result, to the image sensor module 120. The analysis unit 130 also sequentially outputs the image signals A21, A22, etc. together with a synchronization signal SA to the display unit 190.

The exposure information FA fed back to the image sensor module 120 by the analysis unit 130 includes information, such as shutter speed or gain, and is used, for example, to control an exposure so that imaging can be performed with optimum luminance. This function of the analysis unit 130 is called "auto exposure" and provided in a typical type of image pickup unit.

The second image pickup unit 150 includes an image sensor module 160 and an analysis unit 170. The image sensor module 160 includes a lens 162, an imaging element 164, and an adjustment unit 166.

The function blocks of the second image pickup unit 150 perform operations similar to those of the corresponding function blocks of the first image pickup unit 110 except that the analysis unit 170 differs from the analysis unit 130 of the first image pickup unit 110 and that the second image pickup unit 150 receives the synchronization signal SA that the first image pickup unit 110 outputs at which outputting the first picture signal VA. Specifically, the second image pickup unit 150 starts the first exposure in response to the exposure start signal ST and outputs an image signal B21 obtained through the first exposure. Subsequently, the second image pickup unit 150 repeats an exposure and output of an image signal obtained through the exposure. In this way, the second image pickup unit 150 sequentially outputs image signals (B21, B22, etc.) forming the second picture signal VB to the display unit 190. The second image pickup unit 150 outputs a synchronization signal SB along with the picture signals B21, B22, etc.

The first image pickup unit 110 and the second image pickup unit 150 have the same exposure rate (sampling rate). Similarly, the first picture signal VA and the second picture signal VB have the same frame rate. In the present embodiment, it is assumed that the exposure-output time of the second image pickup unit 150 (hereafter referred to as AB) is similar to the exposure-output time of the first image pickup unit 110, AA.

The analysis unit 170 includes a first control unit 172. Except for the function of the first control unit 172, the analysis unit 170 performs an operation similar to that of a typical type of image pickup unit. Specifically, the analysis unit 170 performs analysis by performing image processing on the picture signals B21, B22, etc. from the image sensor module 160 and feeds back exposure information FB to the image sensor module 160. It also sequentially outputs the image signals B21, B22, etc. to the display unit 190 in accordance with the synchronization signal SB. As with the exposure information FA, the exposure information FB fed back to the image sensor module 160 by the analysis unit 170 is information for controlling an exposure so that imaging can be performed with optimum luminance, such as shutter speed or gain for "auto exposure."

In the present embodiment, the analysis unit 170 also incorporates information indicating the amount by which the exposure start timing should be delayed, into the exposure information FB in accordance with a first control signal CTR1 discussed below and outputs the resulting exposure information FB to the image sensor module 160. Note that when the first control signal CTR1 indicates a value "0," the analysis unit 170 performs an operation similar to that of an analysis unit included in a typical type of image pickup unit.

The first control unit 172 will be described in detail. First, referring to FIG. 2, a first difference $\Delta t1$ and a second difference $\Delta t2$ used in the following description will be described. Note that FIG. 2 is an example in which the first control unit 172 does not perform control.

Figure 2:
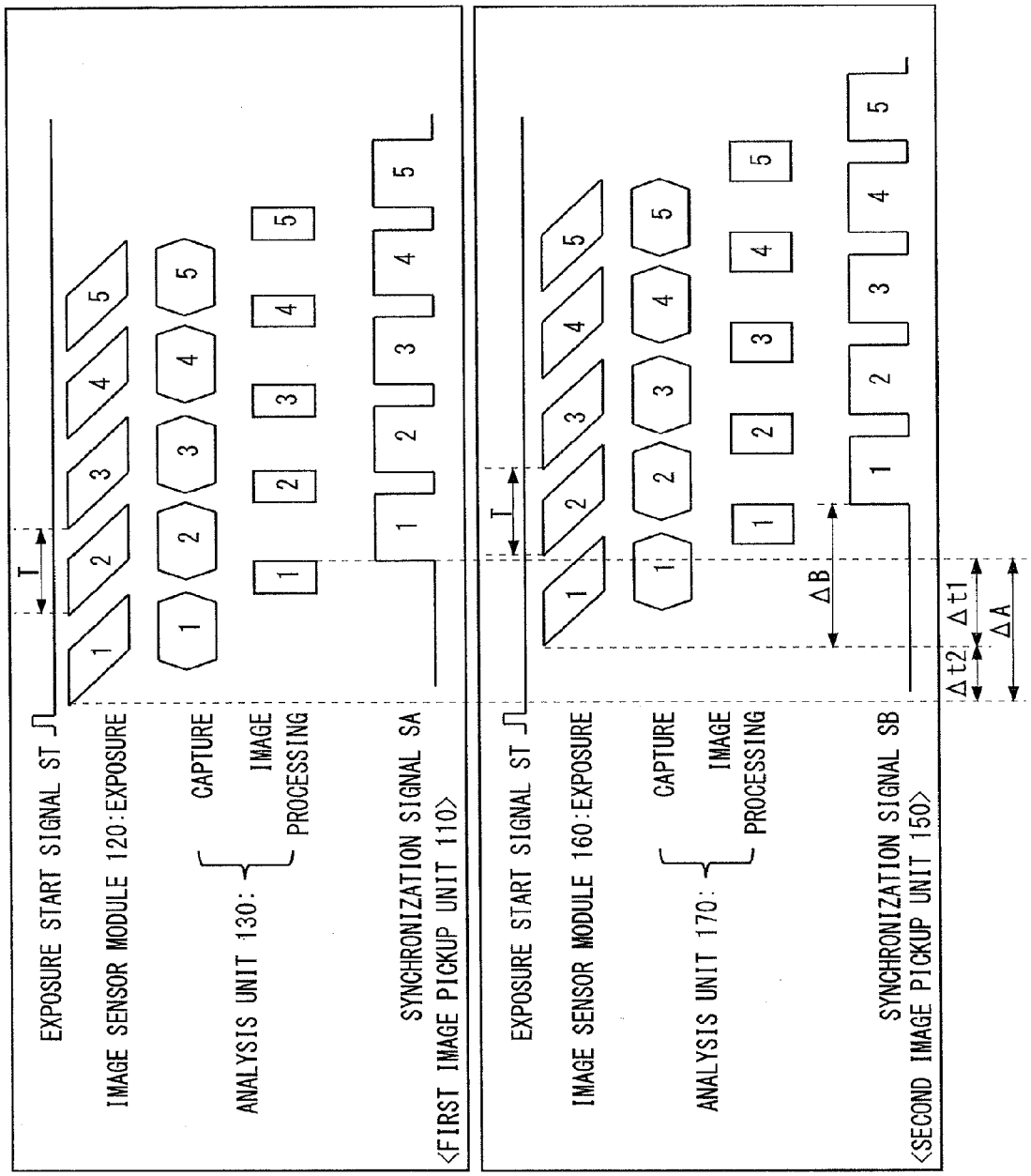
FIG. 2 is a diagram showing an example of the timings of signals in the image pickup apparatus shown in FIG. 1 in a case in which a first control unit does not perform control.

The upper part of FIG. 2 shows an example of the timing relationship among the exposure start signal ST, exposures performed by the image sensor module 120, capture of the image signals (image signals A21, A22, etc.) and image processing for analysis by the analysis unit 130, and the synchronization signal SA in the first image pickup unit 110. Each parallelogram below the exposure start signal ST represents a single exposure; the upper-left vertex thereof represents the timing at which the exposure starts; and the lower-right vertex thereof represents the timing at which the exposure completes. Each hexagon represents a single time of capture by the analysis unit 130; the left vertex thereof represents the timing at which the capture starts; and the right vertex thereof represents the timing at which the capture completes. Each rectangle represents a single time of image processing performed by the analysis unit 130; the left side thereof represents the timing at which the image processing starts; and the right side thereof represents the timing at which the image processing completes. The numbers in the diagram represent the chronological order. For example, the analysis unit 130 receives an image signal obtained through the first exposure at the first capture, performs the first image processing on the image signal, and outputs the resulting image signal in synchronization with a pulse indicated by "1" of the synchronization signal SA.

The interval between two consecutive exposures performed by the first image pickup unit 110 (hereafter referred to as exposure interval) is represented by "T."

The lower part of FIG. 2 shows an example of the timing relationship among the exposure start signal ST, exposures performed by the image sensor module 160, capture of the image signals (image signals B21, B22, etc.) and image processing for analysis by the analysis unit 170, and the synchronization signal SB in the second image pickup unit 150. The meanings of the figures, such as the parallelograms, hexagons, and rectangles, and the numbers are as described above. Since the first image pickup unit 110 and the second image pickup unit 150 have the same exposure rate, the exposure interval of the second image pickup unit 150 is also "T."

As used in the present specification, the first difference $\Delta t1$ refers to the difference between the timing at which the image pickup apparatus 100 starts outputting a predetermined image signal and the timing at which the second image pickup unit 150 starts an exposure for obtaining an image signal that the second image pickup unit 150 outputs immediately after the first image pickup unit 110 starts outputting the predetermined image signal.

In the present embodiment, the first image signal is used as the "predetermined image signal." That is, in the present embodiment, the first difference $\Delta t1$ refers to the difference between the timing at which the first image pickup unit 110 starts outputting the first image signal and the timing at which the second image pickup unit 150 starts an exposure for obtaining an image signal that the second image pickup unit 150 outputs immediately after the first image pickup unit 110 outputs the first image signal.

In the example shown in FIG. 2, the image signal that the second image pickup unit 150 starts outputting immediately after the first image pickup unit 110 outputs the first image signal (image signal A21) is also the first image signal (image signal B21). Accordingly, the first difference $\Delta t1$ is the difference between the timing at which output of the image signal A21 is started and the timing at which the exposure for obtaining the image signal B21 is started.

As described above, in the present embodiment, the synchronization signal SA is also inputted to the second image pickup unit 150. In the second image pickup unit 150, the first control unit 172 of the analysis unit 170 obtains the timing at which the first image pickup unit 110 starts outputting the first image signal (image signal A21), on the basis of the synchronization signal SA and then calculates the difference between the timing obtained and the timing at which the second image pickup unit 150 starts an exposure for obtaining the first image signal (image signal B21). Thus, the first control unit 172 obtains the first difference $\Delta t1$.

The first control unit 172 then subtracts the first difference $\Delta t1$ from the exposure-output time $\Delta A$ of the first image pickup unit 110 to obtain the difference $\Delta t2$ and further subtracts the second difference $\Delta t2$ from the exposure interval T to obtain a value "T−$\Delta t2$." The value "T−$\Delta t2$" serves as the first control signal CTR1 indicating the amount by which the second image pickup unit 150 should delay the timing at which it starts the subsequent exposure. Note that in the present embodiment, the first control unit 172 previously holds the value of the exposure-output time AA of the first image pickup unit 110.

The analysis unit 130 of the first image pickup unit 110 incorporates the amount of delay ("T−$\Delta t2$") indicated by the first control signal CTR1 into the exposure information FB and feeds back the resulting exposure information FB to the image sensor module 160.

Since the image sensor module 160 has already started the second exposure when the first control unit 172 obtains the first control signal CTR1 indicating the value "T−Δt2," the image sensor module 160 delays the third exposure.

Figure 3:
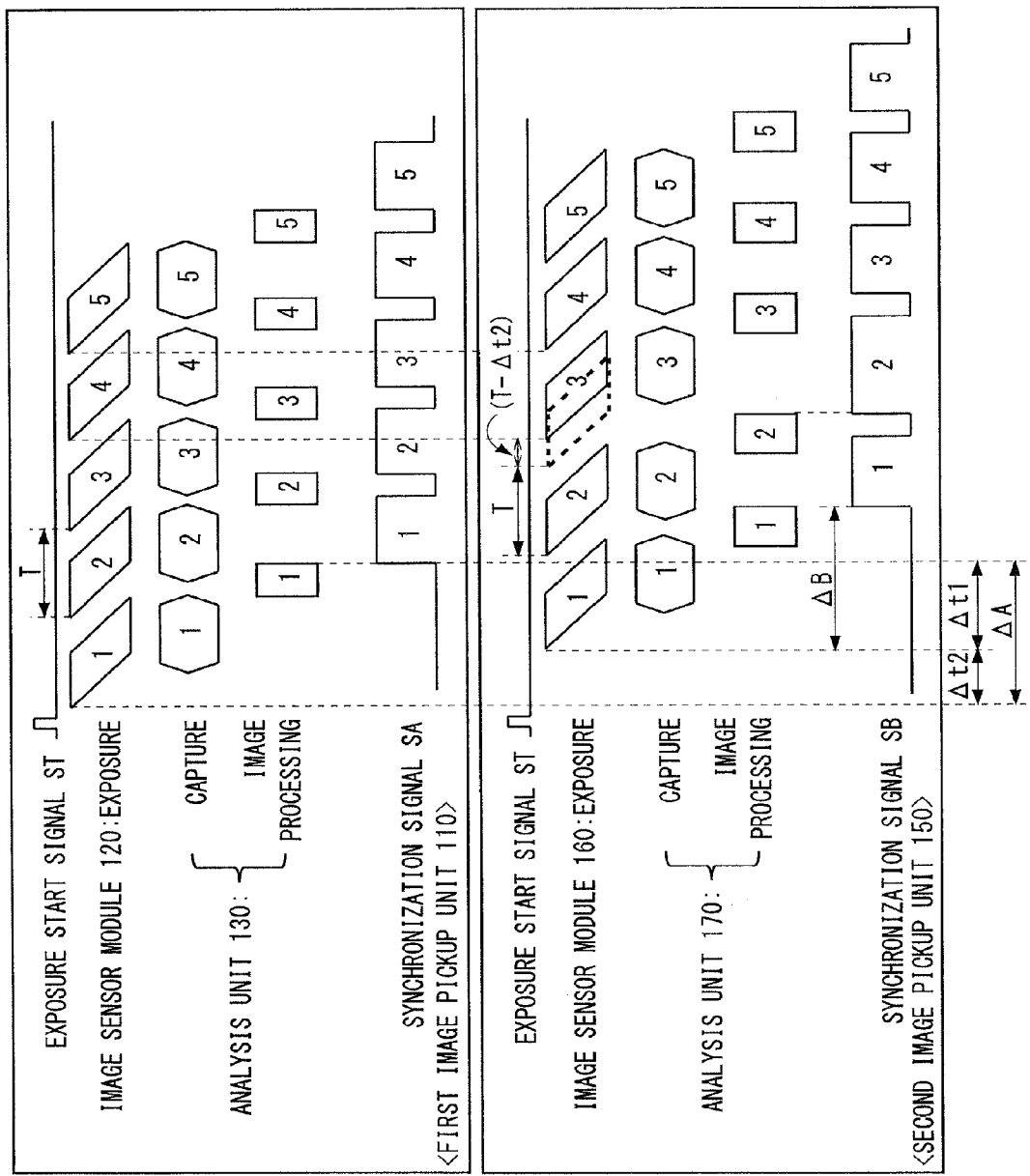
FIG. 3 is a diagram showing an example of the timings of the signals in the image pickup apparatus shown in FIG. 1 in a case in which the first control unit performs control.

Thus, FIG. 2 becomes a timing chart as shown in FIG. 3. Since the image sensor module 160 delays the start of the third exposure by "T−Δ2," the start timings of the third and later exposures (third, fourth, etc.) by the second image pickup unit 150 are the same as the start timings of the fourth and later exposures (fourth, fifth, etc.) by the first image pickup unit 110, respectively.

As described above, in the present embodiment, the exposure-output time ΔA of the first image pickup unit 110 is equal to the exposure-output time ΔB of the second image pickup unit 150. Accordingly, if the start timing of the fourth exposure by the first image pickup unit 110 is the same as the start timing of the third exposure by the second image pickup unit 150, the fourth image signal obtained by the first image pickup unit 110 and the third image signal obtained by the second image pickup unit 150 are outputted at the same timing. The same applies to image signals obtained through later exposures.

As seen above, the image pickup apparatus 100 according to the present embodiment can synchronize the timings at which the two image pickup units start exposures.

Further, if the two image pickup units have the same exposure-output time, the timings at which the two image pickup units output image signals are synchronized.

Second Embodiment

The image pickup apparatus 100 according to the first embodiment synchronizes the timings at which the first image pickup unit 110 and the second image pickup unit 150 start exposures, by delaying the timing at which the second image pickup unit 150 starts an exposure, by "T−Δt2." Alternatively, the timings at which the first image pickup unit 110 and the second image pickup unit 150 start exposures may be synchronized by delaying the timing at which the first image pickup unit 110 starts an exposure. This will be described using an image pickup apparatus 200 according to a second embodiment shown in FIG. 4.

Figure 4:
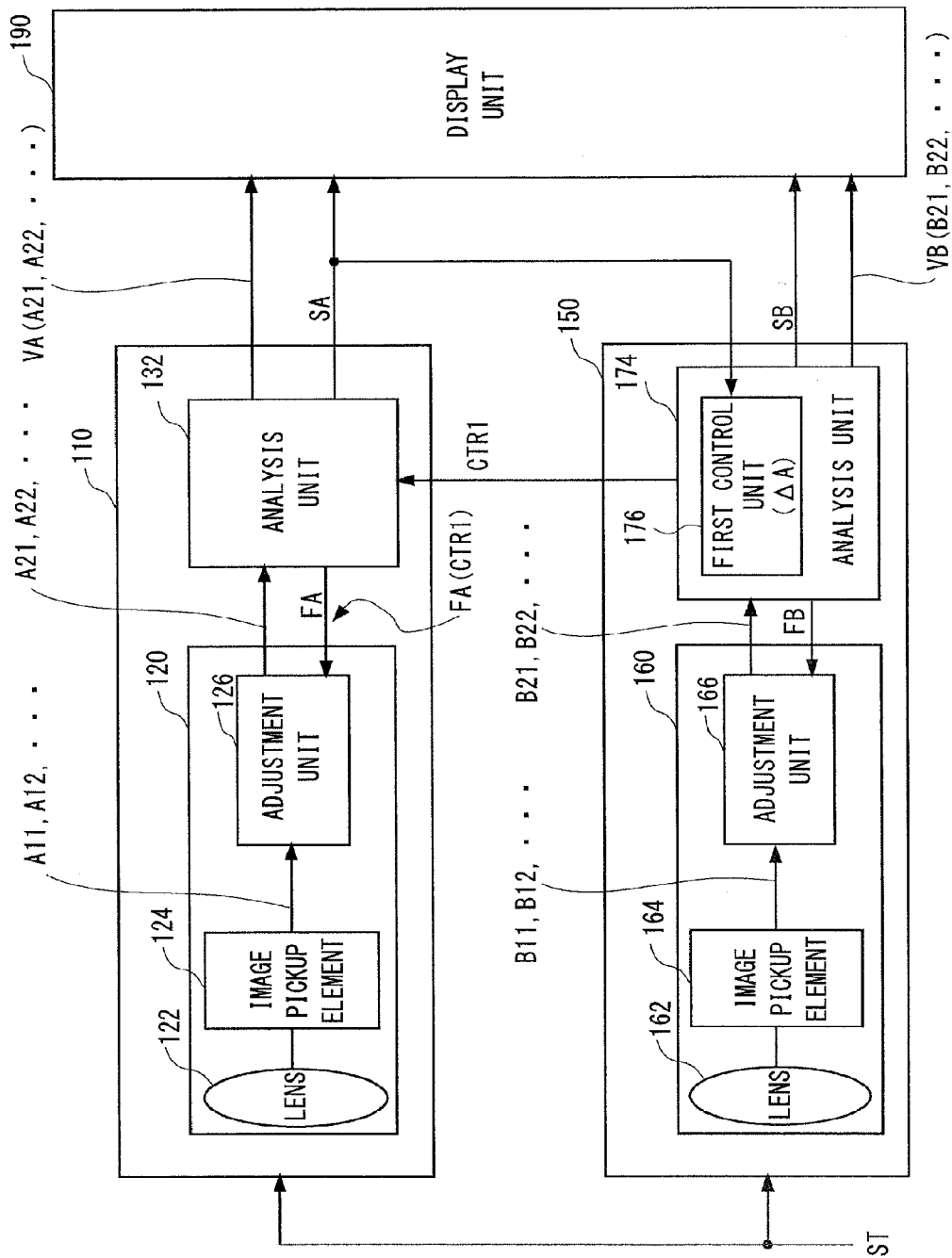
FIG. 4 is a diagram showing an image pickup apparatus according to a second embodiment of the present invention.

The image pickup apparatus 200 shown in FIG. 4 is similar to the image pickup apparatus 100 shown in FIG. 1 except that analysis units 132 and 174 included in the first image pickup unit 110 and the second image pickup unit 150 differ from the analysis units 130 and 170 shown in FIG. 1, respectively.

In the present embodiment, the analysis unit 132 receives the first control signal CTR1 from the second image pickup unit 150, specifically, from the analysis unit 174 of the analysis unit 170. The analysis unit 132 incorporates information indicating the amount by which the exposure start timing should be delayed, into the exposure information FA in accordance with the first control signal CTR1 and outputs the resulting exposure information FA to the image sensor module 120. Note that when the first control signal CTR1 indicates a value "0," the analysis unit 132 operates as an analysis unit included in a typical type of image pickup unit operates.

A first control unit 176 included in the analysis unit 174 of the second image pickup unit 150 outputs the first control signal CTR1 to the analysis unit 132 of the first image pickup unit 110. This first control signal CTR1 differs from the first control signal CTR1 in the first image pickup unit 110. Further, the exposure information FB fed back to the image sensor module 160 by the analysis unit 174 does not include information on the first control signal CTR1.

Hereafter, the first control signal CTR1 outputted by the first control unit 176 of the analysis unit 174 will be described. It is assumed that where the first control unit 176 does not perform control, the timings of the signals are similar to those in the example shown in FIG. 2.

In the present embodiment, the first control unit 176 previously holds the value of the exposure-output time ΔA of the first image pickup unit 110 and subtracts the first difference Δt1 from the exposure-output time ΔA to obtain the difference Δt2. The first control unit 176 then outputs the difference Δt2 to the analysis unit 132 of the first image pickup unit 110.

The analysis unit 130 of the first image pickup unit 110 incorporates the amount of delay (in this case, the difference Δt2) indicated by the first control signal CTR1 into the exposure information FA and feeds back the resulting exposure information FA back to the image sensor module 120.

Since the first image pickup unit 110 has already started the second exposure when the first control unit 176 obtains the first control signal CTR1 indicating the difference Δt2, the first image pickup unit 110 delays the third exposure.

Figure 5:
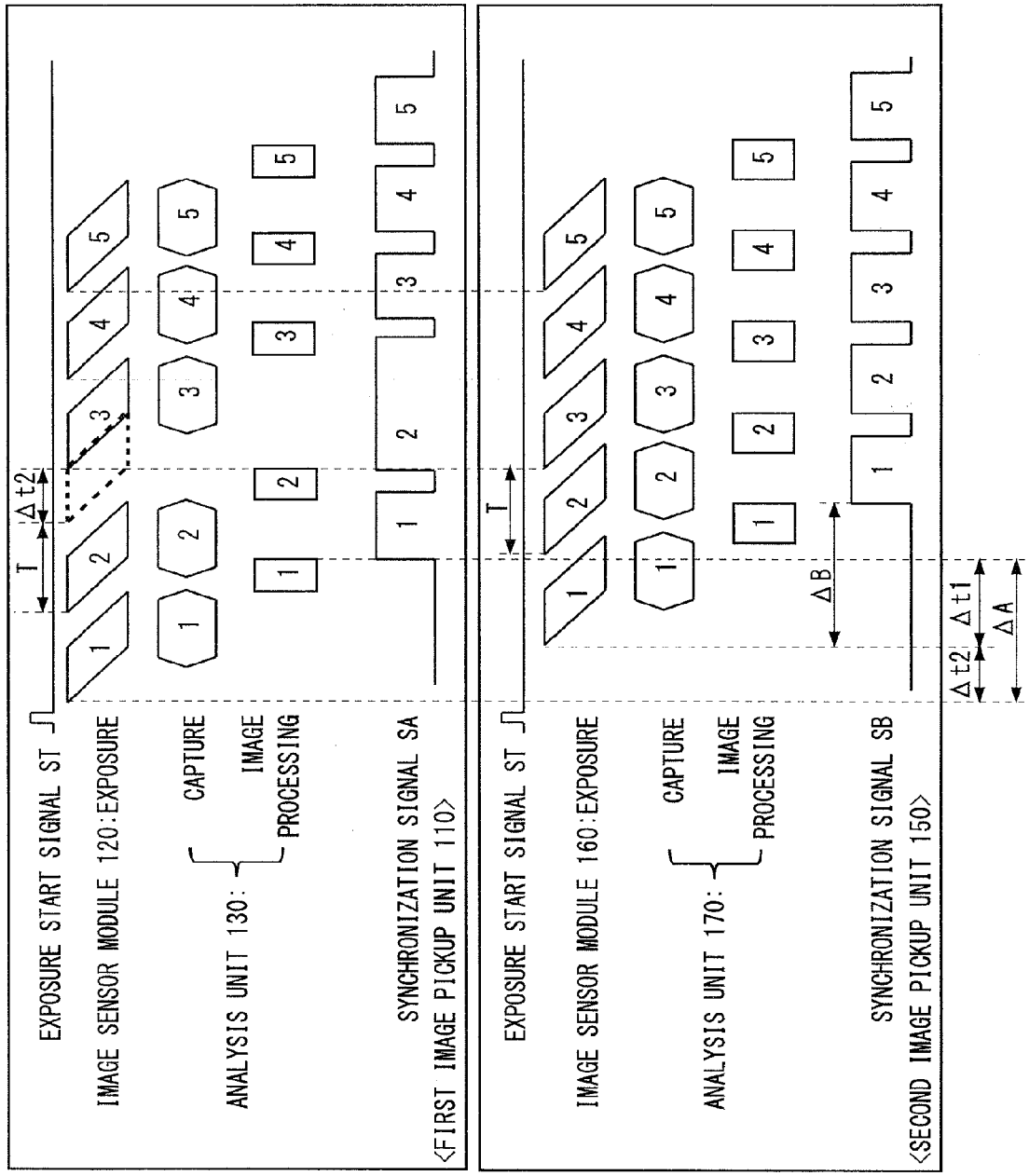
FIG. 5 is a diagram showing an example of the timings of signals in the image pickup apparatus shown in FIG. 4.

Thus, FIG. 2 becomes a timing chart as shown in FIG. 5. Since the image sensor module 120 delays the start of the third exposure by the difference Δt2, the start timings of the third and later exposures (third, fourth, etc.) by the first image pickup unit 110 are the same as the start timings of the third and later exposures (third, fourth, etc.) by the second image pickup unit 150, respectively.

The exposure-output time ΔA of the first image pickup unit 110 is equal to the exposure-output time ΔB of the second image pickup unit 150. Accordingly, if the first image pickup unit 110 and the second image pickup unit 150 start the respective third and later exposures at the same timings, these image pickup units output the respective third and later image signals at the same timings.

As seen above, the image pickup apparatus 200 according to the present embodiment can produce effects similar to those of the image pickup apparatus 100 according to the first embodiment.

Third Embodiment

To perform imaging using two image pickup units and obtain a correct three-dimensional picture, it is necessary to synchronize the timings at which the two image pickup units start respective exposures, as well as to synchronize the timings at which the two image pickup units output respective image signals.

For the image pickup apparatuses 100 and 200, if the two image pickup units (the first image pickup unit 110 and the second image pickup unit 150) have the same exposure-output time (ΔA, ΔB), it is possible to synchronize the timings at which the two image pickup units start exposures, as well as to synchronize the timings at which the two image pickup units output image signals. However, if the exposure-output time varies between the two image pickup units, it is not possible to obtain a correct three-dimensional picture by only synchronizing the timings at which the two image pickup units start exposures.

Figure 6:
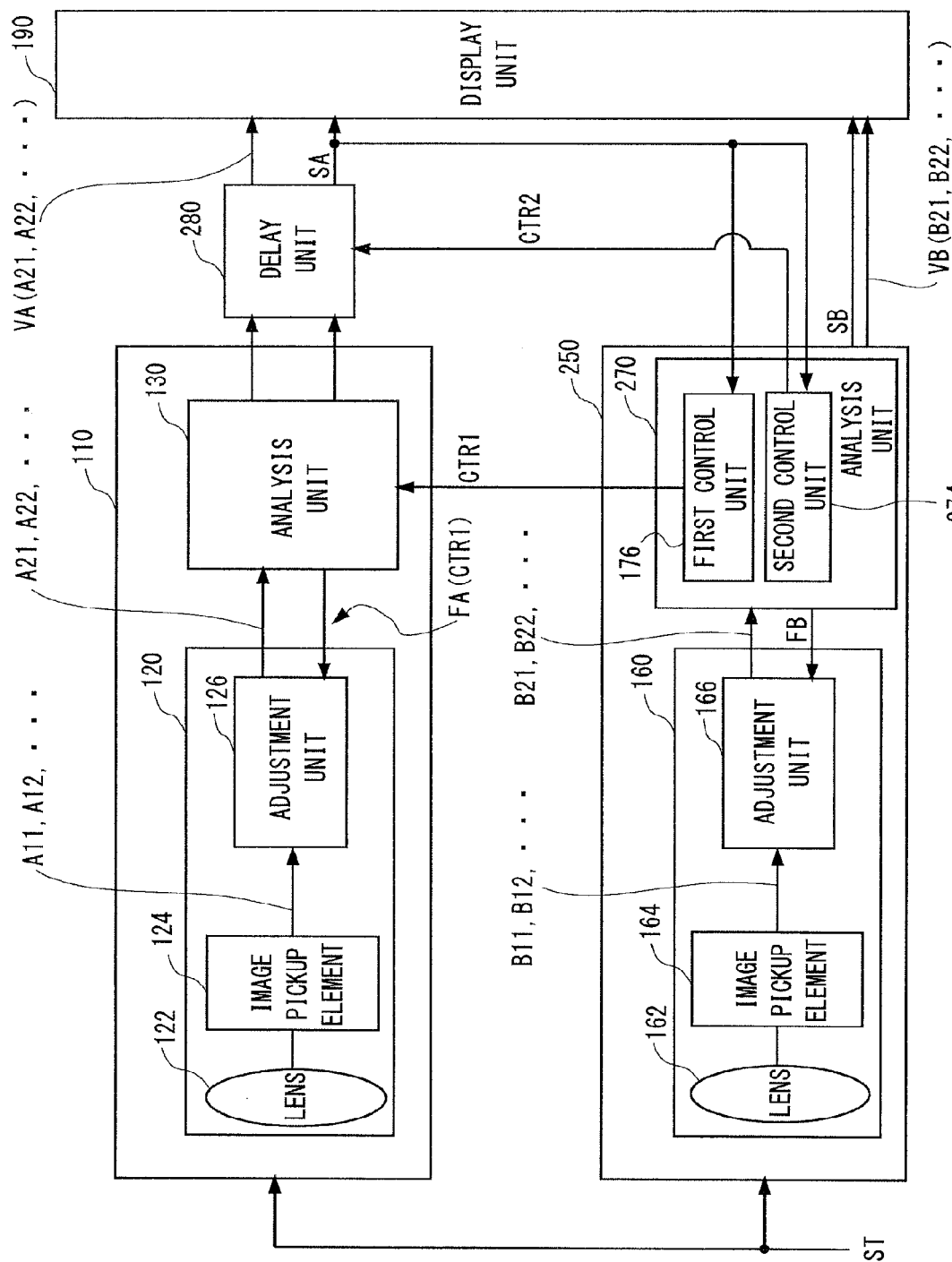
FIG. 6 is a diagram showing an image pickup apparatus according to a third embodiment of the present invention.

On the other hand, even when the exposure-output time varies between the two image pickup units (the first image pickup unit 110 and a second image pickup unit 250), an image pickup apparatus 300 shown in FIG. 6 can synchronize the timings at which the two image pickup units start exposures, as well as can synchronize the timings at which the two image pickup units output image signals. A specific example in which the exposure-output time AA of the first image pickup unit 110 is shorter than the exposure-output time AB of the second image pickup unit 250 will be described.

As shown in FIG. 6, the image pickup apparatus 300 according to the third embodiment of the present invention includes the first image pickup unit 110, the second image pickup unit 250, a delay unit 280, and the display unit 190.

The image pickup apparatus 300 is similar to the image pickup apparatus 200 according to the second embodiment except that the delay unit 280 is provided between the first image pickup unit 110 and the display unit 190, that the exposure-output time AA of the first image pickup unit 110 is shorter than the exposure-output time AB of the second image pickup unit 250, and that the analysis unit 270 further includes a second control unit 274.

Hereafter, the delay unit 280, and the second control unit 274 included in the analysis unit 270 of the second image pickup unit 250 will be described. The other function blocks are similar to the corresponding function blocks of the image pickup apparatus 200 and therefore will not be described.

The delay unit 280 delays an image signal and a synchronization signal from the first image pickup unit 110 by the amount of delay indicated by a second control signal CTR2 from the second image pickup unit 250. Accordingly, if the amount of delay indicated by the second control signal CTR2 is "0," the image signal and the synchronization signal outputted by the first image pickup unit 110 are similar to an image signal and a synchronization signal outputted to the display unit 190 by the delay unit 280.

First, referring to FIG. 7, there will be described the timings of the signals in a case in which the first control unit 176 does not control the timing at which the first image pickup unit 110 starts an exposure and in which the second control unit 274 does not control the delay unit 280. Then, the second control unit 274 will be described. In this case, the respective values indicated by the first control signal CTR1 and the second control signal CTR2 are always "0."

Figure 7:
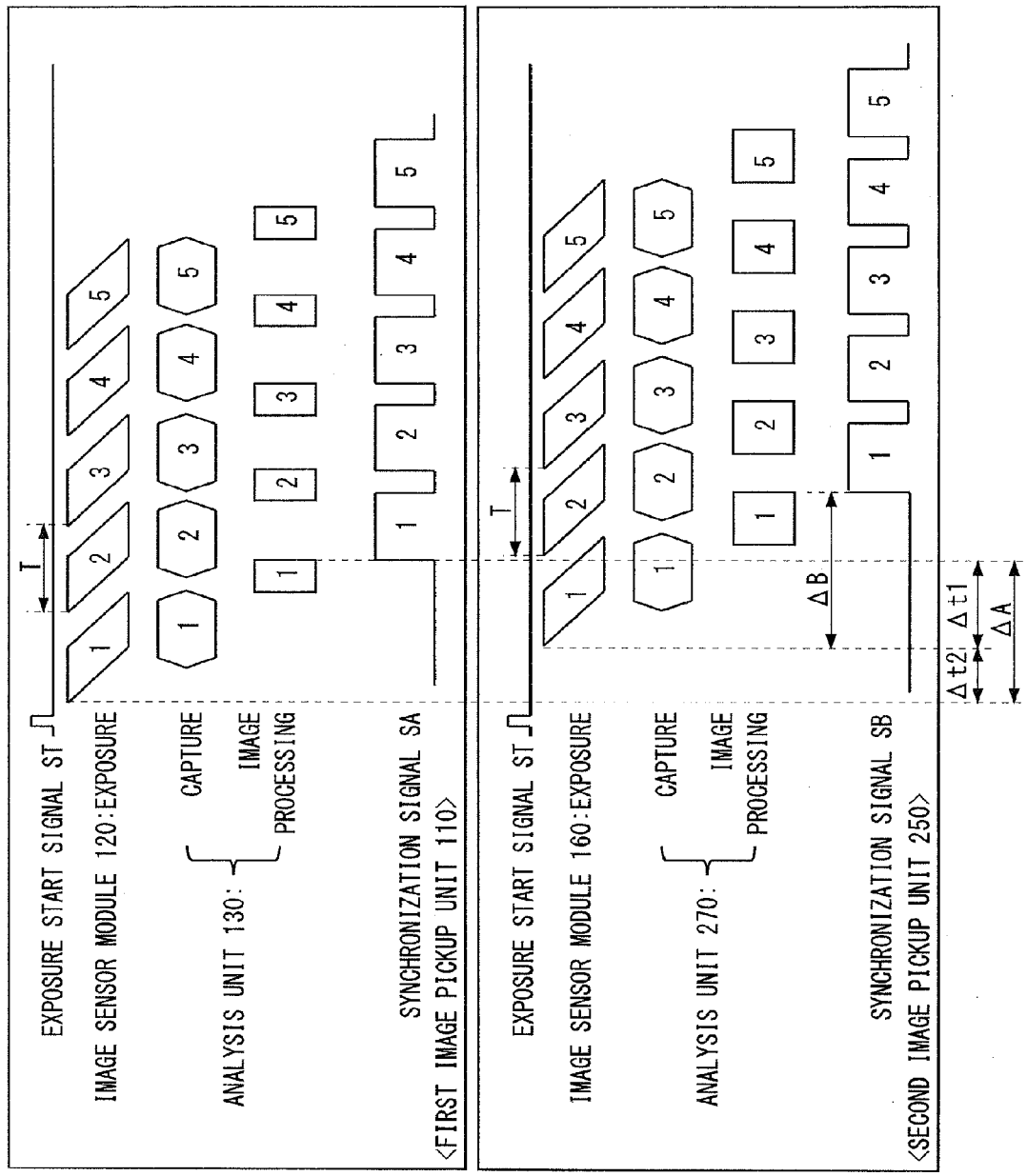
FIG. 7 is a diagram showing an example of the timings of signals in the image pickup apparatus shown in FIG. 6 in a case in which none of first and second control units of a second image pickup unit performs control.

FIG. 7 corresponds to FIG. 2, which is referred to when describing the first and second embodiments. As shown in FIG. 7, the respective timings at which the first image pickup unit 110 and the second image pickup unit 250 start exposures are not synchronized. The respective timings at which the delay unit 280 and the second image pickup unit 250 output image signals to the display unit 190 are not synchronized, either. Further, the exposure-output time ΔB of the second image pickup unit 250 is longer than the exposure-output time ΔA of the first image pickup unit 110.

Figure 8:
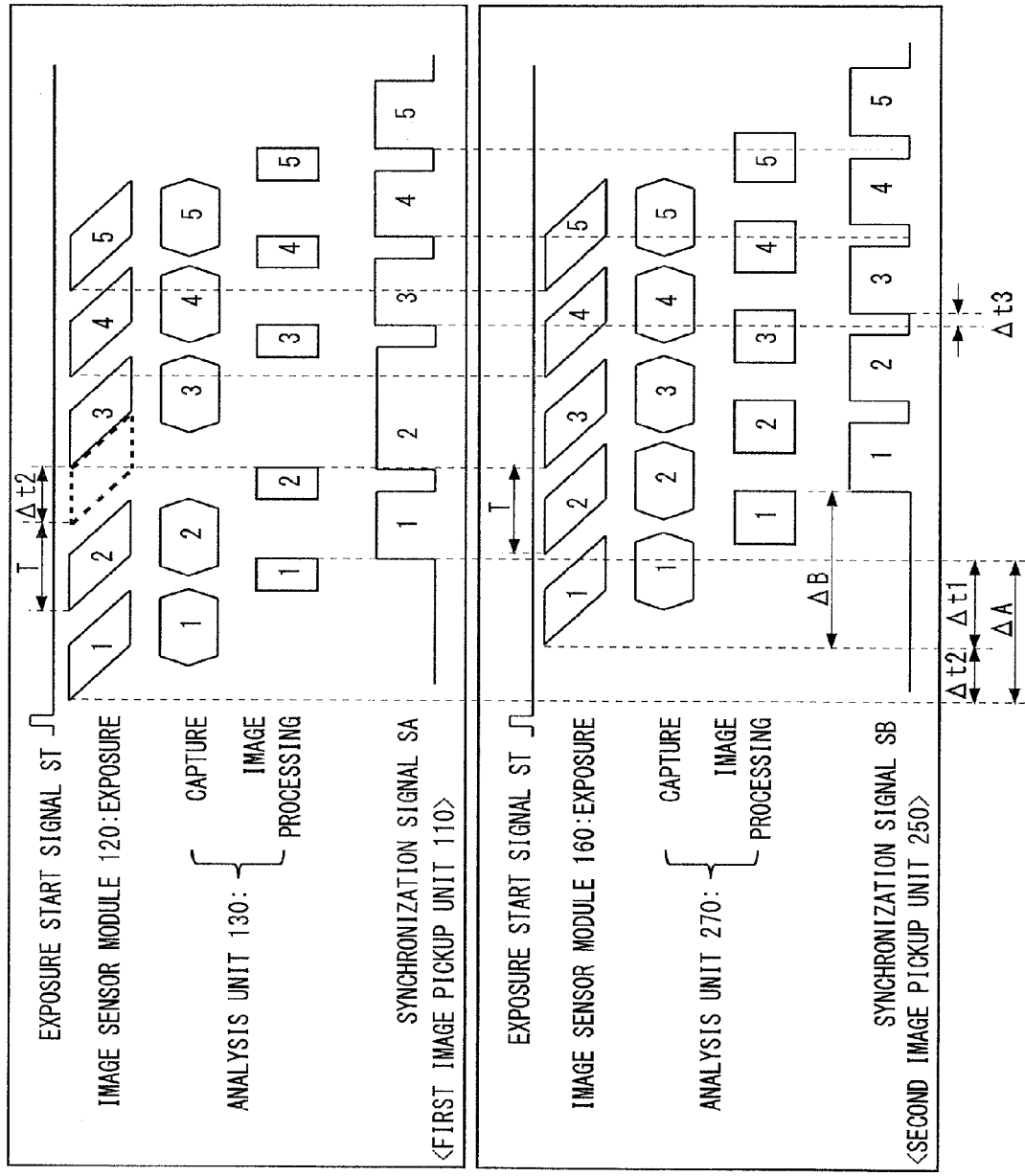
FIG. 8 is a diagram showing an example of the timings of the signals in the image pickup apparatus shown in FIG. 6 in a case in which the first control unit of the second image pickup unit performs control and in which the second control unit thereof does not perform control.

FIG. 8 corresponds to FIG. 5, which is referred to when describing the second embodiment, and is a diagram showing the timings of the signals in a case in which the first control unit 176 controls the timing at which the first image pickup unit 110 starts an exposure and in which the second control unit 274 does not control the delay unit 280 (the second control signal CTR2 is always "0").

In this case, due to the first control signal CTR1 outputted by the first control unit 176 and indicating the difference Δt2, the start timings of the third and later exposures (third, fourth, etc.) by the first image pickup unit 110 are the same as the start timings of the third and later exposures (third, fourth, etc.) by the second image pickup unit 150, respectively.

However, the exposure-output time AA of the first image pickup unit 110 is shorter than the exposure-output time AB of the second image pickup unit 250. Accordingly, even if the timings at which the first image pickup unit 110 starts the exposures are the same as the timings at which the second image pickup unit 250 starts the exposures, the timings at which the first image pickup unit 110 outputs image signals to the display unit 190 via the delay unit 280 after performing the exposures are earlier than the timings at which the second image pickup unit 250 outputs image signals obtained by starting the exposures at the same timings, to the display unit 190, respectively. The difference between these output timings is represented by a third difference Δt3 in FIG. 8.

In the image taking apparatus 300, the second control unit 274 of the analysis unit 270 calculates the third difference Δt3 after the first control unit 176 adjusts the exposure start timing. Specifically, based on the synchronization signal SA, the second control unit 274 calculates the difference between the timing at which the first image pickup unit 110 starts outputting a predetermined image signal and the timing at which the second image pickup unit 250 starts outputting an image signal immediately after the first image pickup unit 110 starts outputting the predetermined image signal. The second control unit 274 then outputs, to the delay unit 280, the second control signal CTR2 indicating the amount of delay corresponding to this difference, that is, the third difference Δt3.

The "predetermined image signal" whose output timing the second control unit 274 uses in the calculation of the third difference Δt3 may be any of image signals obtained by the first image pickup unit 110 through exposures after the first control unit 176 adjusts the exposure start timing. However, to synchronize the output timings earlier, a preferred predetermined image signal is an image signal obtained through an earlier exposure.

In the example shown in FIG. 8, the earliest exposure performed by the first image pickup unit 110 after the first control unit 176 adjusts the timing at which the first image pickup unit 110 starts an exposure is the third exposure after the first image pickup unit 110 receives the exposure start signal ST. The image signal that the second image pickup unit 250 starts outputting immediately after the first image pickup unit 110 starts outputting an image signal obtained through the above exposure is an image signal obtained through the third exposure performed by the second image pickup unit 250.

Accordingly, the second control unit 274 calculates, as the third difference Δt3, the difference between the timing at which the first image pickup unit 110 starts outputting the image signal obtained through the third exposure thereof and the timing at which the second image pickup unit 250 starts outputting the image signal obtained through the third exposure thereof. The second control unit 274 then outputs the second control signal CTR2 indicating the third difference Δt3 to the delay unit 280.

When the delay unit 280 receives the second control signal CTR2, it delays the timing at which the output of an image signal (an image signal obtained through the fourth exposure) to be outputted to the display unit 190 next is started, by the third difference Δt3. Thus, the timings of the signals become those as shown in FIG. 9.

Figure 9:
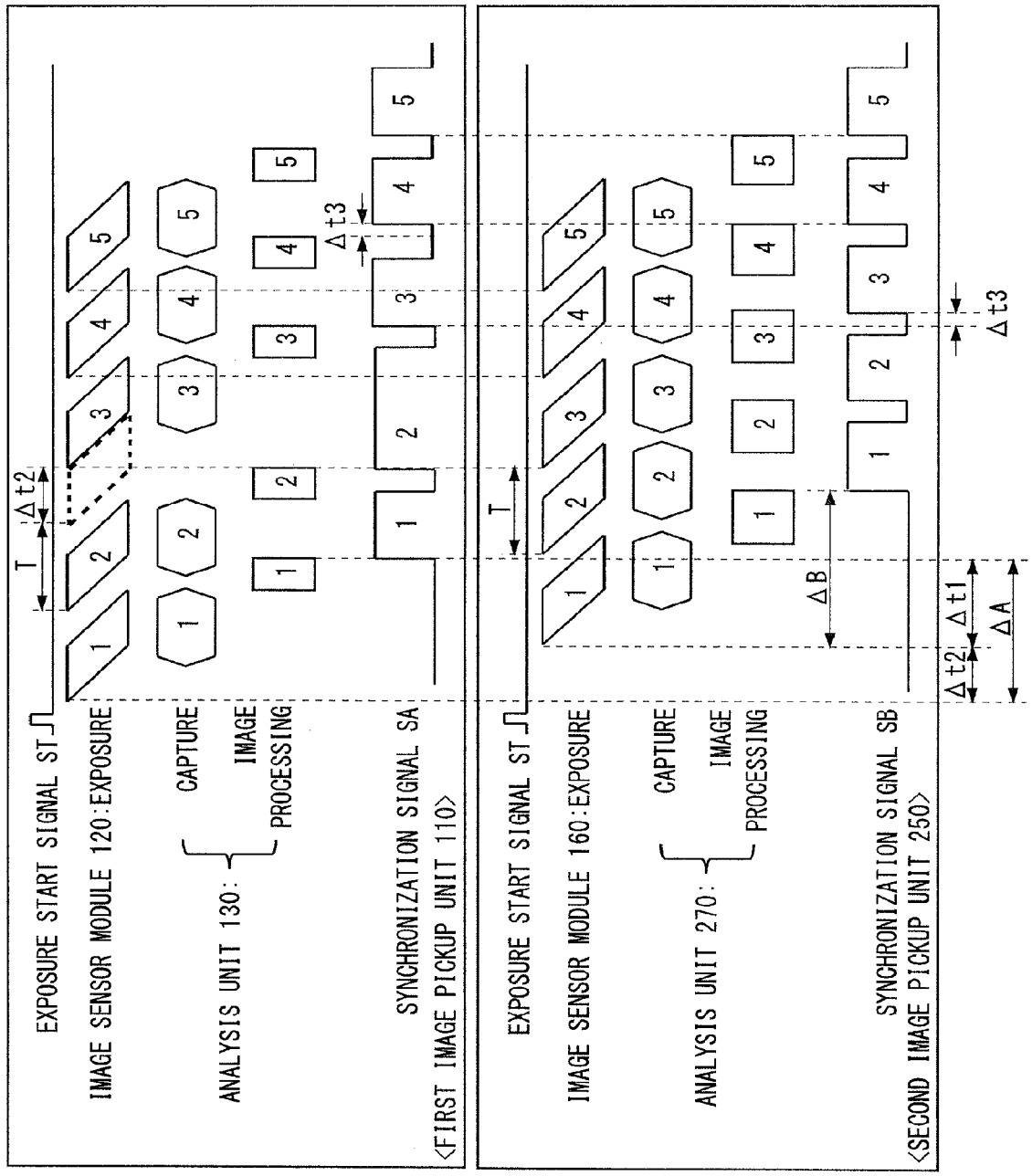
FIG. 9 is a diagram showing an example of the timings of the signals in the image pickup apparatus shown in FIG. 6 in a case in which both the first and second control units of the second image pickup unit perform control.
Figure 10:
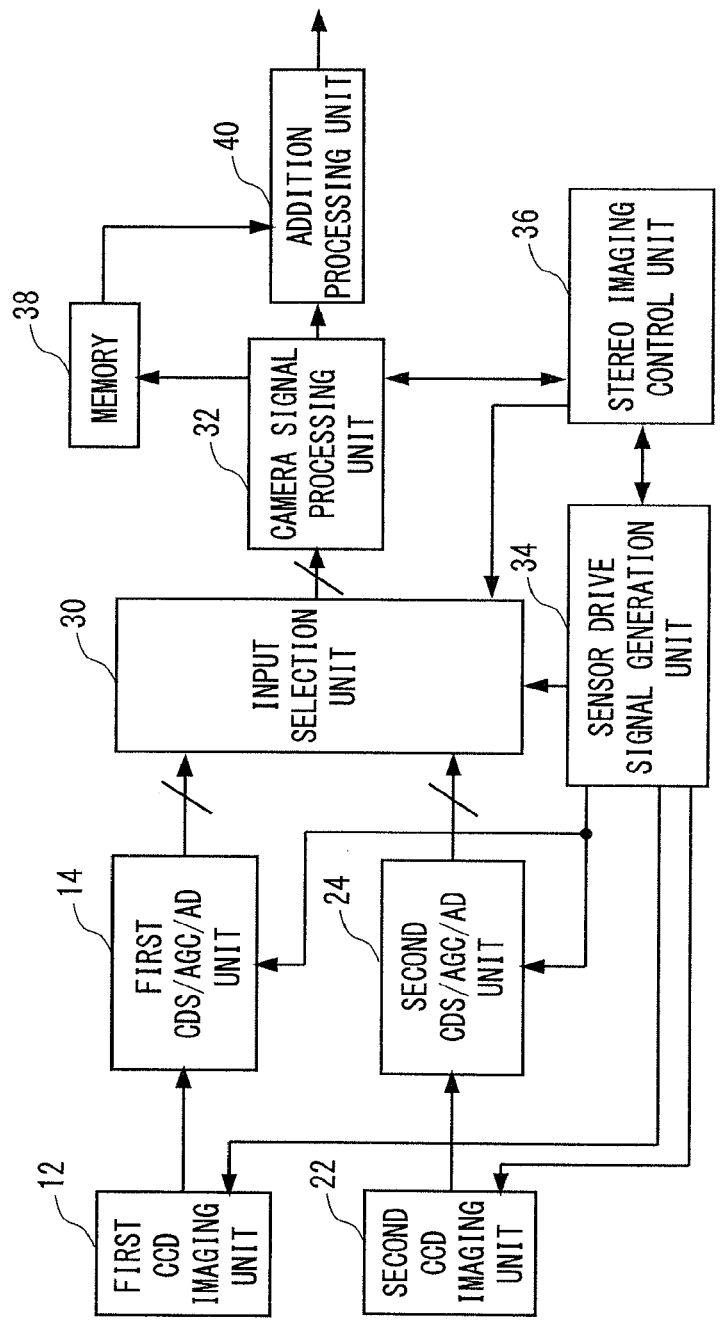
FIG. 10 is a diagram showing a related-art example.

As shown in FIG. 9, the first image pickup unit 110 delays the timing at which it starts outputting an image signal obtained through the fourth exposure thereof to the display unit 190, by the third difference Δt3. As a result, starting with this image signal, respective image signals obtained through exposures performed by the first image pickup unit 110 and the second image pickup unit 250 are synchronized and inputted to the display unit 190.

As seen above, even when the exposure-output time varies between the first image pickup unit 110 and the second image pickup unit 250, the image pickup apparatus 300 according to the present embodiment can synchronize the timings at which the two image pickup units start exposures, as well as can synchronize the timings at which the two image pickup units output image signals.

The present invention has been described based on the embodiments. The embodiments are only illustrative, and various changes, additions, or deletions may be made thereto without departing from the spirit of the present invention. It will be appreciated by those skilled in the art that any modifications resulting from a change, addition, or deletion fall within the scope of the invention.

For example, while the image pickup apparatuses including two image pickup units have been described as the embodiments, the present invention is also applicable to image pickup apparatuses including more than two image pickup units, as a matter of course.

In the image taking apparatus 300 according to the third embodiment, the delay unit 280 is provided outside the image pickup unit having the shorter exposure-output time (first image pickup unit 110). Alternatively, a function block serving as the delay unit 280 may be provided in the image pickup unit having the shorter exposure-output time if the image pickup unit can accommodate such a function block, or the function of the delay unit 280 may be added to an existing function block (for example, analysis unit 130) of the image pickup unit.

While the image pickup apparatus 300 uses the method used by the image pickup apparatus 200 according to the second embodiment as the method for adjusting the timings at which the first image pickup unit 110 and the second image pickup unit 250 start exposures, it may use the method used by the image pickup apparatus 100 according to the first embodiment.

While the exposure start timing and the image signal output timing are each adjusted only once in the embodiments, these timings may be adjusted a plurality of times. Where these adjustments are made a plurality of times, they may be made at predetermined intervals.

The present application claims priority based on Japanese Unexamined Patent Application No. 2011-050114, filed on Mar. 8, 2011, the disclosure of which is incorporated herein in its entirety.

REFERENCE SIGNS LIST

12 FIRST CCD IMAGE PICKUP UNIT
14 FIRST CDS/AGC/AD UNIT
22 SECOND CCD IMAGE PICKUP UNIT
24 SECOND CDS/AGC/AD UNIT
34 SENSOR DRIVE SIGNAL GENERATION UNIT
100 IMAGE PICKUP APPARATUS
110 FIRST IMAGE PICKUP UNIT
120 IMAGE SENSOR MODULE
122 LENS
124 IMAGING ELEMENT
126 ADJUSTMENT UNIT
130 ANALYSIS UNIT
132 ANALYSIS UNIT
150 SECOND IMAGE PICKUP UNIT
160 IMAGE SENSOR MODULE
162 LENS
164 IMAGING ELEMENT
166 ADJUSTMENT UNIT
170 ANALYSIS UNIT
172 FIRST CONTROL UNIT
174 ANALYSIS UNIT
176 FIRST CONTROL UNIT
190 DISPLAY UNIT
200 IMAGE PICKUP APPARATUS
250 SECOND IMAGE PICKUP UNIT
270 ANALYSIS UNIT
274 SECOND CONTROL UNIT
280 DELAY UNIT
300 IMAGE PICKUP APPARATUS
T EXPOSURE INTERVAL
$\Delta t1$ FIRST DIFFERENCE
$\Delta t2$ SECOND DIFFERENCE
$\Delta t3$ THIRD DIFFERENCE
CTR1 FIRST CONTROL SIGNAL
CTR2 SECOND CONTROL SIGNAL

The invention claimed is:

1. A camera comprising:
a first image pickup unit that repeats an exposure and output of an image signal obtained through the exposure to obtain a first picture signal and outputs the first picture signal;
a second image pickup unit that repeats an exposure and output of an image signal obtained through the exposure to obtain a second picture signal and outputs the second picture signal; and
a first control unit that controls the timing at which the first image pickup unit or the second image pickup unit starts an exposure,
a display unit that generates a three-dimensional picture using the first picture signal outputted from the first image pickup unit and the second picture signal outputted from the second image pickup unit, and displays the three-dimensional picture,
wherein
the first control unit subtracts a first difference from an exposure-output time of the first image pickup unit to obtain a second difference, and outputs a first control signal,
the first control signal delaying one of i) the timing at which the second image pickup unit starts an exposure, by a value obtained by subtracting the second difference from an exposure interval, and ii) the timing at which the first image pickup unit starts an exposure, by the second difference,
the exposure-output time being a time lag between when each of the first and second image pickup units starts an exposure and when the image pickup unit starts outputting an image signal obtained through the exposure,
the first difference being a difference between the timing when the first image pickup unit started outputting a predetermined image signal and the timing when the second image pickup unit started an exposure for obtaining an image signal that the second image pickup unit outputted immediately after the first image pickup unit started outputting the predetermined image signal.

2. The camera according to claim 1, wherein
the first control unit obtains the timing at which the first image pickup unit started outputting the predetermined image signal, on the basis of a first synchronization signal in synchronization with which the first image pickup unit outputs an image signal.

3. The camera according to claim 2, wherein
the first control unit is disposed on the same chip as a chip on which the second image pickup unit is disposed.

4. The camera according to claim 3, wherein
the first control unit is disposed on the same chip as a chip on which the second image pickup unit is disposed.

5. The camera according to claim 1, further comprising a second control unit that controls the timing when one image pickup unit, which is the first or second image pickup unit having the shorter exposure-output time, outputs an image signal included in a picture signal, wherein the second control unit calculates a third difference, the third difference being a difference between the timing at which the one image pickup unit started outputting a predetermined image signal included in the picture signal and the timing at which the other image pickup unit started outputting an image signal, included in an picture signal, immediately after the predetermined image signal, and outputs a second control signal for delaying the timing at which the one image pickup unit starts outputting an image signal subsequent to the predetermined image signal included in the picture signal, by the third difference.

6. The camera according to claim 2, further comprising a second control unit that controls the timing when one image pickup unit, which is the first or second image pickup unit having the shorter exposure-output time outputs an image signal included in a picture signal, wherein the second control unit calculates a third difference, the third difference being a difference between the timing at which the one image pickup unit started outputting a predetermined image signal included in the picture signal and the timing at which the other image pickup unit started outputting an image signal, included in an picture signal, immediately after the predetermined image signal, and outputs a second control signal for delaying the timing at which the one image pickup unit starts outputting an image signal subsequent to the predetermined image signal included in the picture signal, by the third difference.

7. The camera according to claim 3, further comprising a second control unit that controls the timing when one image pickup unit, which is the first or second image pickup unit having the shorter exposure-output time, outputs an image signal included in a picture signal, wherein the second control unit calculates a third difference, the third difference being a difference between the timing at which the one image pickup unit started outputting a predetermined image signal included in the picture signal and the timing at which the other image pickup unit started outputting an image signal, included in an picture signal, immediately after the predetermined image signal, and outputs a second control signal for delaying the timing at which the one image pickup unit starts outputting an image signal subsequent to the predetermined image signal included in the picture signal, by the third difference.

8. The camera according to claim 4, further comprising a second control unit that controls the timing when one image pickup unit, having the shorter exposure-output time, outputs an image signal included in a picture signal, wherein the second control unit calculates a third difference, the third difference being a difference between the timing at which the one image pickup unit started outputting a predetermined image signal included in the picture signal and the timing at which the other image pickup unit started outputting an image signal, included in an picture signal, immediately after the predetermined image signal, and outputs a second control signal for delaying the timing at which the one image pickup unit starts outputting an image signal subsequent to the predetermined image signal included in the picture signal, by the third difference.

* * * * *